United States Patent
Lai et al.

(10) Patent No.: US 7,075,975 B2
(45) Date of Patent: Jul. 11, 2006

(54) FAST ADAPTIVE TRANSCEIVER ARCHITECTURE WITH SYMMETRIC PREAMBLE DESIGN

(75) Inventors: Dennis T. Lai, Cerritos, CA (US); Asim Loan, Los Angeles, CA (US)

(73) Assignee: The Titan Corporation, San Diego, CA (US)

( * ) Notice: Subject to any disclaimer, the term of this patent is extended or adjusted under 35 U.S.C. 154(b) by 975 days.

(21) Appl. No.: 09/735,374

(22) Filed: Dec. 11, 2000

(65) Prior Publication Data

US 2002/0075947 A1 Jun. 20, 2002

(51) Int. Cl.
*H04L 5/16* (2006.01)
*H04B 1/06* (2006.01)
*H04B 1/38* (2006.01)
*H04A 7/24* (2006.01)
*H04J 3/16* (2006.01)

(52) U.S. Cl. ................ 375/219; 455/277; 455/561; 370/338; 370/469

(58) Field of Classification Search ........... 375/219; 455/227, 561; 370/338, 469
See application file for complete search history.

(56) References Cited

U.S. PATENT DOCUMENTS

| 5,689,502 | A | * | 11/1997 | Scott ................. 370/281 |
| 5,812,594 | A | * | 9/1998 | Rakib ................. 375/219 |
| 5,828,662 | A | * | 10/1998 | Jalali et al. ........... 370/335 |
| 6,031,866 | A | * | 2/2000 | Oler et al. ............ 375/219 |
| 6,498,790 | B1 | * | 12/2002 | Shaheen et al. ........ 370/347 |

* cited by examiner

*Primary Examiner*—Amanda T. Le
*Assistant Examiner*—Cicely Ware
(74) *Attorney, Agent, or Firm*—Fulwider Patton; Ellsworth R. Roston (57) ABSTRACT

Each of first and second stations, in communicating with the other station, provides a preamble including forward link parameters and reverse link parameters. The forward link parameters in each preamble for each individual station are provided for each station in accordance with the reverse link parameters previously transmitted to the station in packets from the other station. The reverse link parameters in each preamble in each individual station provide an indication to the other station of the forward link parameters to be provided by the other station in the next transmission of a packet to the individual station from the other station. Data is provided in packets at each station to be transmitted to the other station. Each packet transmitted by each station to the other station includes a preamble and includes data after the preamble.

35 Claims, 2 Drawing Sheets

FIG. 1

FAST ADAPTIVE TRANSCEIVER ARCHITECTURE WITH SYMMETRIC PREAMBLE DESIGN

BRIEF DESCRIPTION OF THE INVENTION

This invention relates to systems for, and methods of, transmitting data between first and second stations. More particularly the invention relates to systems for, and methods of, providing communications of data between first and second stations on a more efficient basis than in the prior art.

BACKGROUND OF THE INVENTION

First and second stations have communicated data between the stations for years. In relatively recent times, the communications have been by electronics. In even more recent times, each station has indicated to the other, in communications to the other station, the parameters of the signals which the station is transmitting to the other station. This has increased the efficiency of the communication between the stations. However, the efficiency has not been as great as might otherwise be desired because each station has not considered any ability or needs of the other station, from the standpoint of the reception and processing of data by the other station, in communicating data to the other station.

BRIEF DESCRIPTION OF A PREFERRED EMBODIMENT OF THE INVENTION

This invention provides a preferred embodiment of a system for, and method of, communicating data between first and second stations. In the preferred embodiment, each station takes into account any ability or needs of the other station, from the standpoint of the reception and processing of data by the other station, in communicating data to the other station.

In a preferred embodiment of the invention, each of the first and second stations, in communicating with the other station, provides a preamble including forward link parameters and reverse link parameters. The forward link parameters are provided for each station in accordance with the reverse link parameters previously transmitted to the station in packets from the other station. The reverse link parameters in each preamble in each station provide an indication to the other station of the forward link parameters to be provided by the other station in the next transmission of a packet to the station from the other station. Data is provided in packets at each station to be transmitted to the other station.

Each packet transmitted by each station to the other station includes a preamble and includes data after the preamble. In addition to the forward link parameters and the reverse link parameters, each preamble may include a training sequence which provides sequences for synchronizing the operation of each station with the operation of the other station and for facilitating the recovery and processing of data transmitted to each station from the other station. Parameters from a higher layer network may be provided at each station to modify the reverse link parameters to be provided at the other station for indicating to the other station the forward link parameters to be transmitted in the next packet from the other station.

DETAILED DESCRIPTION OF A PREFERRED EMBODIMENT OF THE INVENTION

Figure 1:
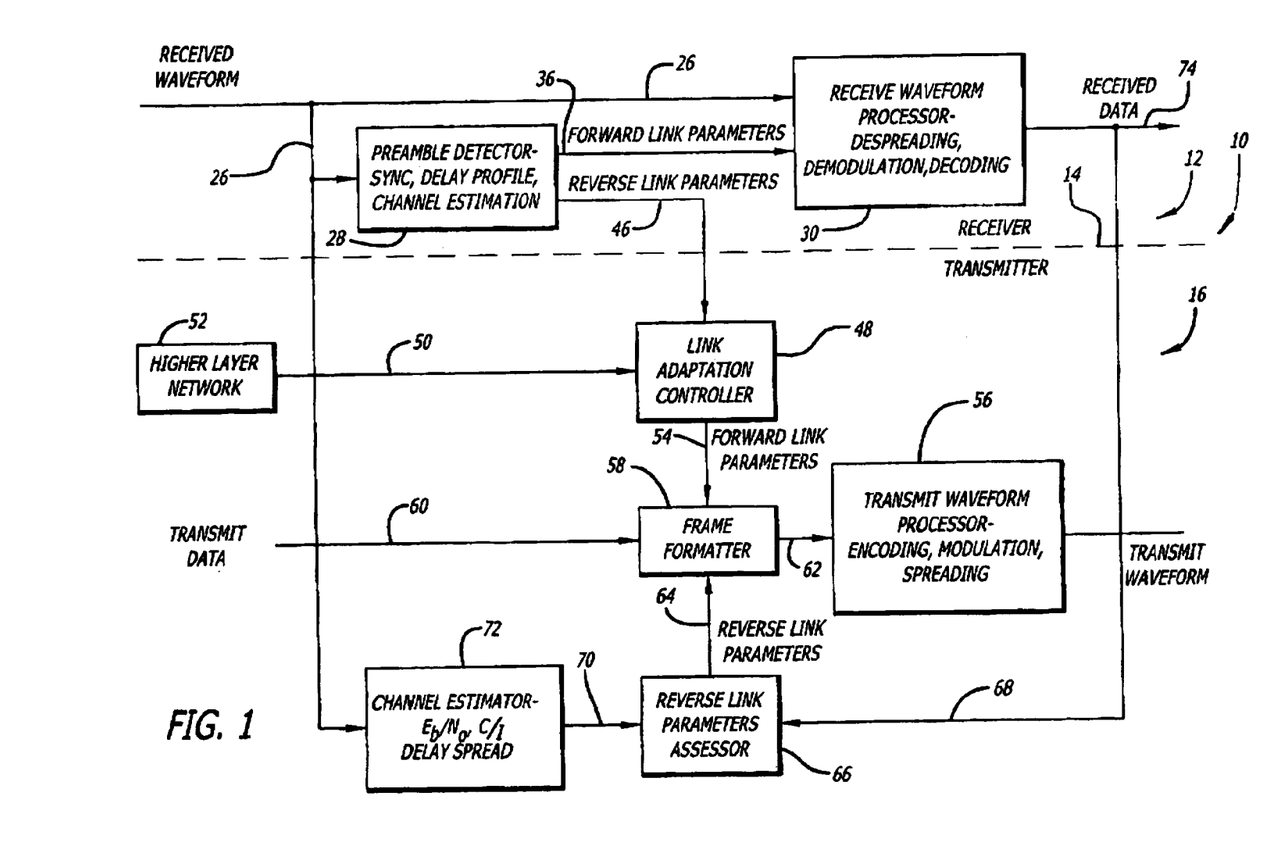
FIG. 1 is a schematic drawing, primarily in block form, of a system constituting a preferred embodiment of the invention for providing a communication of packets of data between first and second stations.

FIG. 1 is a schematic diagram, primarily in block form, of a system or station, generally indicated at 10, constituting a preferred embodiment of the invention. The system 10 includes a receiver generally indicated at 12 (disposed above a horizontally broken line 14) and a transmitter generally indicated at 16 (disposed below the horizontal line 14). The receiver 12 receives and processes signals from a transmitter 22 in a system or station generally indicated at 20 in FIG. 3. The transmitter 22 in the system or station 20 is constructed in a manner similar to the construction of the transmitter 16 in the system or station 10. The transmitter 16 in the system or station 10 transmits signals to a receiver 18 in the system 20. The receiver 18 in the system or station 20 is constructed in a manner similar to the construction of the receiver 12 in the system or station 10. The communication of data between the systems 10 and 20 on a wireless basis is indicated by wavy lines 24 in FIG. 3.

Figure 4:
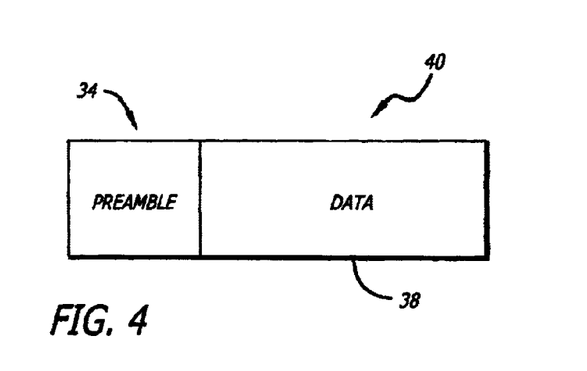
FIG. 4 is a schematic diagram illustrating on a simplified basis the contents of packets of signals communicated by each of the systems in FIG. 1 to the other one of the systems in FIG. 3.

The receiver 12 in the system 10 includes a bus 26 (FIG. 1) for receiving signals from the transmitter 22 in the system 20. The signals may constitute a preamble generally indicated at 34 in FIGS. 2 and 4 and may also include data 38 following the preamble. The preamble 34 and the data 38 are provided in packets generally indicated at 40. The signals received on the line 26 are introduced to a preamble detector 28 and to a receive waveform processor 30. The preamble detector 28 detects signals constituting forward link parameters 32 in the preamble 34 in FIG. 2 and introduces these signals through a bus 36 to the receive waveform processor 30. The processor 30 processes the data in the packet in accordance with the forward link parameters on the bus 36 to provide data signals on a bus 74 for further processing.

Figure 2:
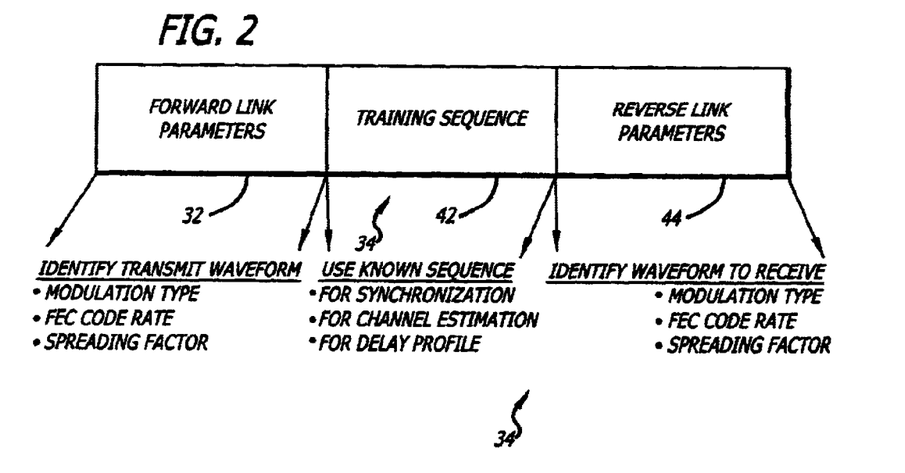
FIG. 2 is a schematic drawing, primarily in block form, showing different portions of a preamble in the data packets for facilitating the transmission of data from each station to the other station and for facilitating the recovery and processing of the data at the other station.

As indicated in FIG. 2, each preamble 34 also includes a training sequence 42 and reverse link parameters 44. The reverse link parameters 44 in each preamble 34 pass through a bus 46 to a link adaptation controller 48 in the transmitter 16. The link adaption controller 48 uses the reverse link parameters from each of the systems 10 and 20 as the forward link parameters in the other one of the systems 10 and 20 unless the link adaptation controller 48 in the other one of the systems receives signals on a bus 50 from a higher layer network 52. When this occurs, the link adaptation controller 48 uses the parameters provided by the higher layer network 52 as the forward link parameters.

The link adaptation controller 48 passes the forward link parameters on a bus 54 to a frame formatter 58. The frame formatter 58 forms frames or packets of signals including signals representing the preamble 34 and signals representing data on a bus 60. The frame formatter 58 passes signals on a bus 62 to a transmit waveform processor 56 in the transmitter 16. The signals from the frame formatter 58 are dependent in part on signals which pass to the frame formatter on a bus 64 from a reverse link parameters assessor 66. The reverse link parameters assessor 66 receives signals on a bus 68 from the receive waveform processor 30 and on a bus 70 from a channel estimator 72. The channel estimator 72 in turn receives the signals on the bus 26.

As previously indicated, each preamble 34 in FIG. 2 includes the forward link parameters 32, the training sequence 42 and the reverse link parameters 44 preferably, although not necessarily, in that order in the preamble 34. Forward link parameters such as the parameters 32 are believed to be known in the art. The forward link parameters 32 identify the transmit waveform in each packet being transmitted by each of the systems 10 and 20 to the other one of the systems. The forward link parameters 32 may identify the modulation type such as, but not limited to, a member of quadrature amplitude modulation (QAM) family and M-ary phase shifting keying (MPSK) family, both modulation families are well known in the art.

As another example, the forward link parameters 32 may identify the code rate of the forward error correction. As a further example, the forward link parameters 34 may identify the spreading factor. The spreading factor identifies the progressive frequencies at which successive packets 40 are transmitted by the transmitter in one of the systems such as the system 10 to the receiver in the other one of the systems such as the system 20. The code rate for forward error correction and the spreading factor for the transmission of successive packets at progressive frequencies are believed to be known in the art.

Reverse link parameters such as the parameters 44 in the preamble 34 are believed to be unknown in the art. The reverse link parameters 44 in the preamble 34 transmitted in each packet 40 from one of the stations such as the station 10 identify to the receiver in the other one of the stations such as the station 20 the parameters of the signals in the packets that the system 20 should transmit to the system 10. For example, the system 10 may identify, in the reverse link parameters 44 in the packets 40 transmitted by the system 10 to the system 20, the type of modulation (e.g., QAM, MPSK) that the system 20 should provide in the packets 40 that the system 20 will be transmitting to the system 10. As another example, the system 10 may identify, in the reverse link parameters 44 in the packets 40 transmitted by the system 10 to the system 20, the code rate of the forward error correction that the system 20 should provide in the packets 40 that the system 20 will be transmitting to the station 10. As a further example, the system 10 may identify, in the reverse link parameters 44 in the packets 40 transmitted by the system 10 to the system 20, the spreading factor of the progressive frequencies in the successive packets 40 that the system 20 will be transmitting to the system 10.

The waveforms (e.g. modulation type, forward error correction code rate and spreading factor) in the forward link parameter 32 transmitted by the station 10 to the station 20 identify to the station 20 parameters that the station 10 has provided in the packets 40 transmitted by the station 10 to the station 20 and that the station 20 should use in recovering and processing the data that it has received. Similar waveforms are included in the forward link parameters 32 transmitted by the station 20.

As previously indicated, each preamble 34 may include a training sequence 42. The training sequence 42 may include a known sequence for providing different identifications. For example, the training sequence 42 may include a known sequence for providing a clock synchronization between the signals transmitted by the system 10 and the signals received by the system 20. In effect, the synchronization provides a common clock at the systems 10 and 20. As another example, the training sequence 42 may include a known sequence for channel estimation. As a further example, the signals transmitted by the system 10 may include a sequence for providing a delay profile. The channel estimation and the delay profile illustratively provide for the elimination of the effects of multi-path transmission between the systems 10 and 20. In this way, the effects of any multi-path signals (those bouncing off one or more objects before reaching the receiving station) will be eliminated. As will be appreciated, due to the adaptive nature of the system the channel profile will not change significantly with time so that only one correction generally has to be provided for multi-path transmission.

In the training sequence 42, the delay profile indicates the relative times that a station such as the station 20 initially receives signals transmitted from the station 10 (with no bounce off intermediately disposed objects) and that the station such as the station 20 subsequently receives after the signals have bounced off intermediately disposed objects. The channel estimator indicates the relative phase and gain of the signals received by the station 20 after transmission directly from the station 10. The sequence relating to delay profile and channel estimation provides an opportunity for the station 20 to provide equalizers which will facilitate the recovery at the station 20 of the signals received by the station 20 directly from the station 10.

Figure 3:
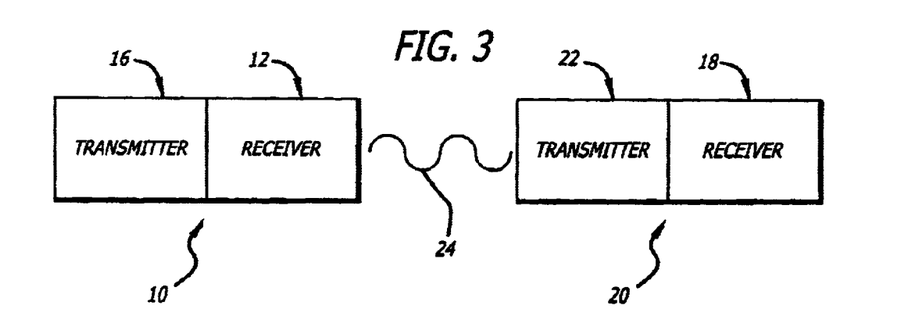
FIG. 3 is a schematic drawing, primarily in block form, of two (2) systems each constructed in accordance with FIG. 1 for communicating data between the stations.

Assume that the system 10 in FIG. 1 receives packets 40 of signals on the bus 26 from the system 20 in FIG. 3. The preamble detector 28 separates the training sequence 42 of signals indicating the synchronization, the delay profile and the channel estimation in the packets 40 and processes the signals received in accordance with the training sequence to provide the corrections (e.g. equalizers) represented by these signals. The preamble detector 28 provides on the bus 36 the signals representing the forward link parameters. These signals pass to the receive waveform processor 30 which processes the signals representing the data 38 in the packets 40. In processing the signals in the packets 40, the processor 30 despreads, demodulates and decodes the signals in accordance with the parameters indicated in the forward link parameters 32 in the preamble 34. After being despread, demodulated and decoded, the signals representing the data pass through the bus 74 for further processing of the data.

The preamble detector 28 also separates the reverse link parameters 44 in the preamble 34 and passes these parameters through the bus 46 to the link adaption controller 48 which is included in the transmitter 16 in the system 10. The link adaptation controller 48 converts these parameters to forward link parameters 32 and passes the forward link parameters on the bus 54 to the frame formatter 58.

It may be that parameters having a higher priority than the received reverse link parameters 44 in the preamble 34 exist. These higher priority parameters may be provided by the transmitter 16 either internally or from an external source. For example, they may be provided by the higher layer network 52 and may be introduced on the bus 50 to the link adaptation controller 48 to supersede the forward link parameters on the bus 46. The signals from the higher layer network 52 may result from the fact that the system 10 may have a multiple number of layers and one of the layers such as a medium access controller (MAC) may have a higher priority than the reverse link parameters 44 on the bus 46 in providing the forward link parameters 32 for the transmitter 16 in the system 10. Although the language in this paragraph refers to one specific instance where the higher layer network 52 is adopted as the forward link parameter for the second station instead of the reverse link parameter from the first station, this can be generalized from the discussion on pages 4–10 of the specification so that each station adopts a higher layer network as the forward link parameter for the station instead of the reverse link parameter from the other station.

The formatter 58 formats the preamble 34 and the data 38 (FIG. 4) in packets, the data being provided on the bus 60. The formatter introduces the packets 40 on the bus 62 to the transmit waveform processor 56 which provides such functions as encoding, modulating and spreading the frequency in progressive packets 40 in accordance with the forward link parameters 32 passing through the link adaptation controller 48.

The frame formatter 58 also receives parameters from the reverse link parameter assessor 66 and modifies the format of each frame or packet 40 in accordance with the assessment provided of the reverse link parameters by the assessor. The assessor 66 provides this assessment in accordance with the received data on the bus 68 and in accordance with an assessment provided by the channel estimator 72. The estimator 72 provides such estimation in accordance with such parameters as $E_b/N_o$, C/I and Delay Spread.

In the expression Eb/No, Eb indicates bit energy and No indicates noise density (in other words, the thermal noise at the receiver). The expression Eb/No accordingly indicates the signal-to-noise ratio in the transmission of data between the systems 10 and 20. Furthermore, in the expression C/I, C indicates carrier power and I indicates interference power including military jamming. Delay spread indicates the time dispersive nature of the propagation medium between the systems 10 and 20. The multi-path transmission occurs when signals transmitted between the systems 10 and 20 bounce off one or more objects in their transmission between the systems, thereby delaying the reception of the signals at the second system after transmission from the first system. The channel estimator 72 accordingly takes into account various parameters which may affect the quality of the signals received at the second system after transmission from the first system.

The system or station 20 operates in a manner similar to that described above for the system or station 10. The system 20 receives packets 40 of signals from the system 10. The packets 40 include forward link parameters 32, a training sequence 42 and reverse link parameters 44 and also include data 38. The receiver 18 in the system 20 processes the data 38 in accordance with the forward link parameters 32 in the preamble 34. The transmitter 22 in the system 20 provides forward link parameters 32, in the packets transmitted by the system 20 to the system 10, in accordance with the reverse link parameters 44 transmitted in the packets 40 by the system 10 to the system 20. As will be appreciated, the forward link parameters 32 in the packets 40 transmitted by the system 20 to the system 10 may be modified in accordance with parameters provided by the higher layer network 52 in the system 20.

In this way, each of the systems 10 and 20, in communicating with the other system, provides a preamble 34 including forward link parameters 32 and reverse link parameters 44. The forward link parameters 32 are provided for each of the systems 10 and 20 in accordance with the reverse link parameters 44 previously transmitted to the system in a packet 40 from the other system. The reverse link parameters 44 for each preamble 34 in each of the systems 10 and 20 provide an indication to the other system of the forward link parameters to be provided by the other system in the next transmission of a packet 40 by the other system.

Each packet 40 transmitted by each of the systems 10 and 20 to the other system includes a preamble 34 and includes data after the preamble. In addition to the forward link parameters and the reverse link parameters, each preamble 34 may include a training sequence 42 which provides sequences for synchronization, channel estimation and delay profile. Parameters such as Eb/No, C/I and delay spread and parameters from the higher layer network 52 may be provided at each of the systems 10 and 20 to modify the reverse link parameters from the other system in providing the forward link parameters 32 to be transmitted in the next packet 40 to the other system. As will be seen from the discussion previously relating to the channel estimator 72 in each station, the parameters such as Eb/No, C/I and delay spread for that station correspond to the parameters specified for the channel estimator 72 on page 11 of the specification for the station. The designation "higher layer network" indicates that the higher layer network 52 for each station has a hither priority in providing the forward link parameters for that station than the reverse link parameters from the other station.

The systems and methods of this invention have certain definite advantages over the prior art. They provide for each of the systems 10 and 20 to transmit to the other system the reverse link parameters that the other system should transmit as forward link parameters in the next packets 40 to the first system. They also provide changes generated internally or received from external sources and indicating how the forward link parameters should be modified in one of the systems when the system sends packets to the other system.

Although this invention has been disclosed and illustrated with references to particular embodiments, the principles involved are susceptible for use in numerous other embodiments which will be apparent to persons of ordinary skill in the art. The invention is, therefore, to be limited only as indicated by the scope of the appended claims.

What is claimed is:

1. A method of communicating between first and second stations, including the steps of:

providing at the first station a first preamble including first reverse link parameters and first forward link parameters individual to the first station and providing first data after the preamble, transmitting the first preamble and the first data from the first station to the second station in accordance with the first forward link parameters in the first preamble, receiving the first preamble and the first data at the second station and recovering the first data at the second station, providing a second preamble and second data at the second station, the second preamble at the second station including second forward link parameters in accordance with the first reverse link parameters received at the second station from the first station and including second reverse link parameters, and transmitting the second preamble including the second forward link parameters and second reverse link parameters and the second data from the second station to the first station.

2. A method as set forth in claim 1, including the steps of:
receiving at the first station the second preamble including the second forward link parameters and the second reverse link parameters and the second data from the second station and recovering the second data at the first station in accordance with the second forward link parameters in the second preamble from the second station.

3. A method as set forth in claim 2, including the steps of:
providing at the first station a third preamble and third data after the third preamble, the third preamble including third reverse link parameters individual to the first station and third forward link parameters corresponding to the second reverse link parameters and the third data constituting new data individual to the first station, and
transmitting the third preamble including the third reverse link parameters and the third forward link parameters corresponding to the second reverse link parameters and the third data to the second station.

4. A method as set forth in claim 3, including the steps of:
receiving at the second station the third preamble including the third reverse link parameters and the third forward link parameters and the third data and recovering the third data,
providing a fourth preamble and fourth data at the second station, the fourth preamble at the second station including fourth forward link parameters in accordance with the third reverse link parameters received at the second station from the first station and also including fourth reverse link parameters, and
transmitting the fourth preamble including the fourth reverse link parameters and the fourth forward link parameters and the fourth data from the second station to the first station.

5. A method as set forth in claim 1, including the steps of:
providing a higher layer network in the fourth preamble at the second station in place of the third reverse link parameters received at the second station to constitute the fourth forward link parameters in the next preamble transmitted by the second station to the first station.

6. A method as set forth in claim 1, including the steps of:
providing at the first station a preamble including reverse link parameters individual to the first station and providing data after the preamble,
transmitting the preamble and the data from the first station to the second station,
receiving the preamble and the data at the second station and recovering the data at the second station,
providing a preamble and data at the second station, the preamble including forward link parameters in accordance with the reverse link parameters received at the second station from the first station,
transmitting the preamble and data from the second station to the first station,
providing at the second station a channel estimation from the preamble and the data received at the second station,
providing a reverse link parameters assessment at the second station in accordance with the data received at the second station and the channel estimation at the second station,
formatting a frame at the second station in accordance with the reverse link parameters assessment at the second station and the data to be transmitted at the second station and the forward link parameters, and
processing the forward link parameters and the formatted frame at the second station in accordance with the forward link parameters to provide waveforms for transmission to the first station.

7. A method of communicating between first and second stations, including the steps of:
providing at the first station a first preamble including first forward link parameters and first reverse link parameters, both individual to the first station, and providing first data after the first preamble,
transmitting the first preamble and the data from the first station to the second station,
receiving the first preamble and the first data at the second station,
recovering the first data at the second station in accordance with the first forward link parameters from the first station,
providing at the second station a second preamble including second forward link parameters in accordance with the first reverse link parameters received at the second station and including second reverse link parameters individual to the second station and providing second data after the second preamble, and
transmitting the second preamble and the second data from the second station to the first station.

8. A method as set forth in claim 7, including the steps of:
receiving at the first station the second preamble and the second data from the second station and recovering the received data in accordance with the second forward link parameters in the second preamble,
providing at the first station a third preamble including third forward link parameters in accordance with the second reverse link parameters received at the first station and including third reverse link parameters individual to the first station and providing third data after the third preamble, and
transmitting the third preamble and the third data from the first station to the second station.

9. A method as set forth in claim 8, including the steps of:
receiving the third preamble and the third data at the second station,
recovering the third data at the second station in accordance with the third forward link parameters received in the third preamble at the second station,
providing at the second station a fourth preamble including fourth forward link parameters in accordance with the third reverse link parameters received at the second station and including fourth reverse link parameters individual to the second station and providing fourth data after the fourth r preamble, and
transmitting the fourth preamble and the fourth data from the second station to the first station.

10. A method as set forth in claim 9, including the steps of:
receiving the fourth preamble and the fourth data at the first station, and
recovering the fourth data at the first station in accordance with the fourth forward link parameters received in the fourth preamble at the first station.

11. A method as set forth in claim 7, including the steps of:
providing a higher layer network at the second station with a higher priority than the reverse link parameters from the first station, and providing for the adoption of the higher layer network as the second forward link parameters at the second station.

12. A method as set forth in claim 8, including the steps of:
providing a channel estimation from the first preamble and the first data received at the second station,
providing an assessment of the channel estimation and the received data at the second station to determine the second reverse link parameters individual to the second station.

13. A method as set forth in claim 8,
receiving at the first station the second preamble and the second data from the second station and recovering the received data in accordance with the second forward link parameters in the second preamble,
providing at the first station a third preamble including third forward link parameters in accordance with the second reverse link parameters received at the first station and including third reverse link parameters individual to the first station and providing third data after the third preamble,
transmitting the third preamble and the third data from the first station to the second station,
providing a channel estimation from the first preamble and the first data received at the second station, and
providing an assessment of the channel estimation and the received data at the second station to determine the second reverse link parameters individual to the second station.

14. In a method of communicating between first and second stations, the steps of:
providing at the first station a first preamble including first forward link parameters and first reverse link parameters,
providing first data after the first preamble, and
transmitting signals representing the first preamble and the first data in a packet to the second station, and
providing at the second station a second preamble including second forward link parameters and second reverse link parameters, the second forward link parameters corresponding to the first reverse link parameters.

15. In a method as set forth in claim 14 wherein a training sequence is included in the first preamble.

16. In a method as set forth in claim 14 wherein
the first forward link parameters include information relating to at least one of modulation type, code rate of a forward error correction and spreading factor of the signals in the packet.

17. In a method as set forth in claim 14 wherein
the first reverse link parameters include information relating to at least one of modulation type, code rate of a forward error rate correction and spreading factor of signals in a preamble in a packet to be transmitted from the second station to the first station.

18. In a method as set forth in claim 14 wherein
the first preamble includes a training sequence and the training sequence includes sequences for at least one of sequence synchronization, channel estimation and delay profile.

19. In a method as set forth in claim 14 wherein
the first forward link parameters include information relating to at least one of modulation type, code rate of a forward error correction and spreading factor of the signals in the packet and wherein the first reverse link parameters include information relating to at least one of modulation type, code rate of a forward error rate correction and spreading factor of signals in a preamble in a packet to be transmitted from the second station to the first station and wherein
the first preamble includes a training sequence and the training sequence includes a sequence of at least one of synchronization, channel estimation and delay profile.

20. A method of communicating between a first station and a second station, including the steps of:
providing for each station, in communicating with the other station, a preamble including forward link parameters and reverse link parameters,
providing data for each station to be transmitted to the other station,
providing for each station packets each including a preamble to be transmitted from the station to the other station and each including data to be transmitted after the preamble, each preamble including forward link parameters and reverse link parameters,
the forward link parameters for the preamble in each station being provided in accordance with the reverse link parameters previously transmitted to the station in a packet from the other station, and
the reverse link parameters for each preamble in each individual station providing an indication to the other station of the forward link parameters to be provided by the other station in the next transmission of a packet from the other station to the individual station.

21. A method as set forth in claim 20 wherein
each preamble to be transmitted from each of the first and second stations to the other of the first or second stations includes a training sequences.

22. A method as set forth in claim 21 wherein
each training sequence includes at least one of synchronization, channel estimation and delay profile.

23. In combination,
a first station constructed to provide a preamble including forward link parameters and reverse link parameters and including data after the preamble,
a second station displaced from the first station and constructed to provide a preamble including forward link parameters and reverse link parameters and including data after the preamble,
the first station being constructed to transmit its preamble and data to the second station for processing by the other one of the stations,
the first station being constructed to provide as its forward link parameters the reverse link parameters, received from the second station.

24. In a combination as set forth in claim 23,
the first station including in the preamble a training sequence for coordinating its station with the operation of the second station.

25. In a combination as set forth in claim 23,
the first station including, in the forward link parameters transmitted to the second station, signals for facilitating the recovery of the data transmitted by the other station and for facilitating the processing of the recovered data.

26. In a combination as set forth in claim 23,
a higher layer network in the first station,
a higher layer network in the second station,
the higher layer network in the first station being used instead of the reverse link parameters in the second station in providing the forward link parameters for the first station.

27. In a combination as set forth in claim 23, the forward link parameters for each individual station including at least one type of modulation, code rate of forward error corrections and spreading factor of progressive frequencies used in transmitting successive packets of signals from the individual link station to the other station.

28. In a combination as set forth in claim 24, each of the stations including, in the forward link parameters transmitted to the other station, signals for facilitating the recovery of the data transmitted by the other station and for facilitating the processing of the recovered data, a higher layer network in the first station, a higher layer network in the second station, the higher layer network in the first station being used instead of the reverse link parameters in the second station in providing the forward link parameters for the first station, and the forward link parameters for each station including types of at least one of modulation, code rate of forward error corrections and spreading factor of progressive frequencies used in transmitting successive packets of signals between the stations.

29. In combination in a first station for receiving data from, and transmitting data to, a second station, a receiver in the first station for receiving from the second station signals including a preamble and data after the preamble, the preamble including forward link parameters and reverse link parameters, a preamble detector in the receiver in the first station for detecting the forward link parameters and the reverse link parameters, a first processor responsive in the receiver in the first station to the forward link parameters for processing the data in accordance with the forward link parameters, and a transmitter in the first station, a link adaptation controller in the transmitter in the first station for providing forward link parameters in accordance with the reverse link parameters received by the receiver in the first station from the second station, and a second processor in the first station for processing data at the transmitter in the first station in accordance with the forward link parameters provided by the link adaptation controller to obtain signals for transmission to the second station.

30. In a combination as set forth in claim 29, an assessor for providing reverse link parameters individual to the first station, and a frame formatter for formatting a preamble including the forward link parameters and the reverse link parameters in a preamble and for formatting the preamble and the data in packets.

31. In a combination as set forth in claim 29, a network responsive to higher sources than the reverse link parameters for superseding the reverse link parameters in providing the forward link parameters for the transmitter in the first station.

32. In a combination as set forth in claim 30, a channel estimator for estimating parameters to be provided in facilitating the recovery of the signals transmitted by the second station to the first station, and the assessor being responsive to the data received from the second station and to the parameters estimated by the channel estimator for providing the reverse link parameters to the frame formatter.

33. In a combination as set forth in claim 30, a network responsive to higher sources than the reverse link parameters for superseding the reverse link parameters in providing the forward link parameters for the transmitter, a channel estimator for estimating parameters to be provided in facilitating the recovery at the second station of the signals transmitted by the first station to the second station, and the assessor being responsive to the data received from the second station and to the parameters estimated by the channel estimator for providing the reverse link parameters to the frame formatter.

34. In combination in a first station for transmitting first data to a second station and for receiving second data from the second station, a controller for providing forward link parameters having characteristics for facilitating the recovery by the second station of data transmitted by the first station to the second station, an assessor for providing reverse link parameters individual to the first station in facilitating the recovery by the second station of data from the first station and in facilitating the processing of the recovered data by the second station, a formatter responsive to the forward link parameters, the reverse link parameters and the data to be transmitted to the second station from the first station for formatting the forward link parameters, the reverse link parameters and the data into packets, and a processor at the first station for processing the data in the packets in accordance with the forward link parameters to provide signals for transmission to the second station.

35. In a combination as set forth in claim 34, an estimator for estimating parameters for facilitating the recovery at the second station of the signals received at the second station from the first station, the assessor being responsive to the parameters estimated by the estimator for providing the reverse link parameters.

* * * * *

UNITED STATES PATENT AND TRADEMARK OFFICE
CERTIFICATE OF CORRECTION

| | | |
|---|---|---|
| PATENT NO. | : 7,075,975 B2 | Page 1 of 2 |
| APPLICATION NO. | : 09/735374 | |
| DATED | : July 11, 2006 | |
| INVENTOR(S) | : Dennis T. Lai et al. | |

It is certified that error appears in the above-identified patent and that said Letters Patent is hereby corrected as shown below:

<u>Column 6,</u>
Line 25, delete "hither" and insert --higher--.

<u>Column 8,</u>
Line 53, delete "fourth r preamble" and insert --fourth preamble--.

<u>Column 10</u>, delete lines 11 through 30, and insert --providing for each of the first and second stations, a preamble including forward link parameters and reverse link parameters, providing data for each of the first and second stations to be transmitted to an other of the first or second stations, providing for each station packets each including a preamble to be transmitted from each of the first station and second stations to the other of the first or second stations and each packet including data to be transmitted after the preamble, each preamble including forward link parameters and reverse link parameters, the forward link parameters for the preamble in each of the first and second stations being provided in accordance with the reverse link parameters previously transmitted to the first or second stations in a packet from the other of the first or second stations, and the reverse link parameters for each preamble in each of the first or second stations providing an indication to the other of the first or second stations of the forward link parameters to be provided by the other of the first of second stations in the next transmission of a packet from the other of the first or second stations to the first or second stations.--

<u>Column 10,</u>
Line 34, delete "sequences" and insert --sequence--.

UNITED STATES PATENT AND TRADEMARK OFFICE
CERTIFICATE OF CORRECTION

PATENT NO. : 7,075,975 B2
APPLICATION NO. : 09/735374
DATED : July 11, 2006
INVENTOR(S) : Dennis T. Lai et al.

It is certified that error appears in the above-identified patent and that said Letters Patent is hereby corrected as shown below:

Column 10,
Line 49, delete "other one of the stations" and insert --second station--.
Line 61, delete "other station" and insert --second station--.

Signed and Sealed this

Seventeenth Day of April, 2007

JON W. DUDAS
*Director of the United States Patent and Trademark Office*